United States Patent [19]
Hoff

[11] 3,710,083
[45] Jan. 9, 1973

[54] NORMALIZATION CIRCUIT FOR POSITION LOCATOR

[75] Inventor: Wallace J. Hoff, Ellicott City, Md.

[73] Assignee: Westinghouse Electric Corporation, Pittsburgh, Pa.

[22] Filed: Feb. 11, 1971

[21] Appl. No.: 114,524

[52] U.S. Cl. ............. 235/151.3, 33/224, 235/151.32
[51] Int. Cl. ........................... G01c 17/38, G06g 7/78
[58] Field of Search ......... 235/151.3, 151.32, 150.26; 33/204 D, 224; 324/117 H

[56] References Cited

UNITED STATES PATENTS

| 3,355,942 | 12/1967 | Freeman | 33/224 X |
| 2,581,436 | 1/1952 | McCarthy | 33/204 X |
| 3,002,282 | 10/1961 | Rumrill | 33/141.5 |

Primary Examiner—Eugene G. Botz
Assistant Examiner—Edward J. Wise
Attorney—F. H. Henson, E. P. Klipfel and S. Weinberg

[57] ABSTRACT

Apparatus, carried by a person who is walking, for measuring distance traversed and direction of travel. Direction of travel is determined by an electronic compass which generates voltages which are proportional to the horizontal component of the Earth's magnetic field. These voltages control the output frequency of a voltage controlled oscillator (VCO). Because the output frequency of the VCO responds to the component voltages, it also changes in response to variations in the Earth's magnetic field, and the output of the VCO is multiplied with the output voltage from the distance measuring circuit and with the output voltages from the electronic compass in order to reduce the effects of the changes in the Earth's magnetic field.

12 Claims, 4 Drawing Figures

NORMALIZATION CIRCUIT FOR POSITION LOCATOR

The invention herein described was made in the course of or under a contract or subcontract thereunder, with the Department of Defense.

CROSS-REFERENCE TO RELATED APPLICATION

This application is related to application Ser. No. 114,530 by Wallace J. Hoff, Robert L. Parks and Donald G. Kadron, filed Feb. 11, 1971 and assigned to the same assignee as the present application.

BACKGROUND OF THE INVENTION

1. Field of The Invention

The present invention relates, in general, to a circuit which compensates for unwanted deviations in an input parameter so that an output signal, which is a measurement of the input parameter, is not greatly affected by such deviation. More specifically, it relates to a normalization technique usable in a position locator. A position locator operates to tell someone how far he has traveled, possibly by walking, and in what direction he has traveled. Accordingly, it requires compass-related circuitry and distance measuring circuitry.

2. Description of The Prior Art

Previous position locator systems have contained a resolving compass which was essentially a floating disk with an attached bar magnet. The magnet aligned itself with the Earth's magnetic field while two holes in the disk allowed a light source to illuminate a trigonometric tapered photosensitive material thereby generating electrical heading vectors. Distance was measured in this system by "dialing in" an anticipated step length and counting each step with an inertia switch.

Tests on this system were encouraging but some difficulties were encountered in attaining the desired resolution from the compass. In addition, the distance measuring technique resulted in system errors when an operator's step length varied in difficult terrain. The inertia switch also caused errors in very difficult terrain by generating multiple step counts. However, performance of the system was sufficiently good in level terrain to verify the system concept.

Subsequently, an automatic step length measuring system was developed for attachment to the position locator. This measuring system eliminated errors due to step length variations and provided electrical signals which could easily be used to synchronize the system and eliminate the inertia switches. Nevertheless, up until the present time, the development of a compass which continued to provide accurate data as a person traveled over relatively large distances had remained a significant problem area.

BRIEF SUMMARY OF THE INVENTION

Broadly, the present invention concerns a circuit for receiving component signals which are derived from a parameter which is subject to deviations. More specifically, it describes a circuit which determines the direction in which a person is traveling and the distance which he traverses in that direction. An electronic compass provides signals related to the direction of travel by producing voltages which are related to the magnitude of the Earth's magnetic field. Additional circuitry is provided to compensate for deviations in the Earth's magnetic field.

In order to compensate for the deviations, means are provided to generate component signals in the form of first and second heading signals which are related to the direction in which the person is traveling. A resultant signal related to the component signals, and therefore related to the magnitude of the Earth's magnetic field at the locator position, is compared to a reference signal.

Before a person begins to use the position locator, he calibrates the system by establishing a predetermined relationship between the magnitude of the resultant signal and the reference signal by adjusting at least one of them. More specifically, he sets the two signals substantially equal to one another. Therefore, any deviations in the Earth's magnetic field which are subsequently detected by the position locator will appear as an error signal which will be a function of the difference between the resultant signal and the reference signal.

An additional circuit provides a signal which is related to the magnitude of the distance traversed. The distance-related signal is multiplied in a multiplying means with other signals. For example, it is multiplied with the component signals from the electronic compass. After the error signal is derived, it is directed to the multiplying means where it is operable to reduce the effect of the deviations in the Earth's magnetic field. The outputs of the multiplier means are signals which are an accurate indication of the direction traveled and the distance traversed in that direction.

BRIEF DESCRIPTION OF THE DRAWINGS

For a better understanding of the invention, reference may be had to the preferred embodiment, exemplary of the invention, shown in the accompanying drawings, in which.

DETAILED DESCRIPTION OF THE INVENTION

The present invention deals with an apparatus which is adapted to be carried by a person who is walking along a highway, in a field, or anywhere on the surface of the earth in order to tell him where he is. The circuitry provides the person with map coordinates. In an operative embodiment, the map coordinates are in the UTM (Universal Transverse Mercator) system. It will be understood, however, that the teachings of the present invention may be applied to other kinds of movement — for example, movement by a vehicle.

The Earth's magnetic field is used to determine the direction in which a person is traveling. The Earth's magnetic field can be thought of as being resolved into a vertical component and a horizontal component. An electronic compass used in the preferred embodiment is designed to remain horizontal at all times so that it is unaffected by the vertical component of the Earth's magnetic field. Consequently, the output of the electronic compass will be affected only by the horizontal component of the Earth's magnetic field. When a sensor of the electronic compass is pointed (i.e. aligned) in the direction of the horizontal component, its output will be at a maximum. The output of the sensor will decrease as the sensor direction is changed.

Figure 1:
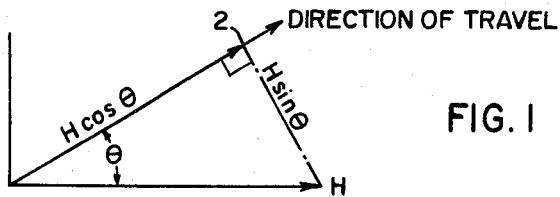
FIG. 1 graphically illustrates the relationship between the Earth's magnetic field and the direction of travel.

Referring to FIG. 1, the horizontal axis, H, indicates, for illustration purposes, the direction and magnitude of the horizontal component of the Earth's magnetic field. If the person using the electronic compass were facing in the direction indicated by the abscissa of FIG. 1, the output of the aforementioned sensor of the electronic compass would be at a maximum. As the person turns, thereby turning the sensor of the electronic compass, however, its output will decrease because a lesser amount of the horizontal component of the Earth's magnetic field will be aligned with the sensitive axis of the compass. For example, the arrow 2 indicates a possible direction of travel, and consequently, the direction in which the electronic compass sensor will be facing. The vector which indicates the direction of the horizontal component of the Earth's magnetic field (hereinafter referred to simply as the Earth's magnetic field) makes an angle with the vector in the direction of travel and that angle is used in the circuitry to indicate the direction of travel. Letting the magnitude of the Earth MAGNETIC FIELD BE SET AT AN ARBITRARY VALUE H, ONE COMPONENT OF THE FIELD BECOMES Hcos$\theta$ and the other component becomes Hsin$\theta$.

Figure 2:
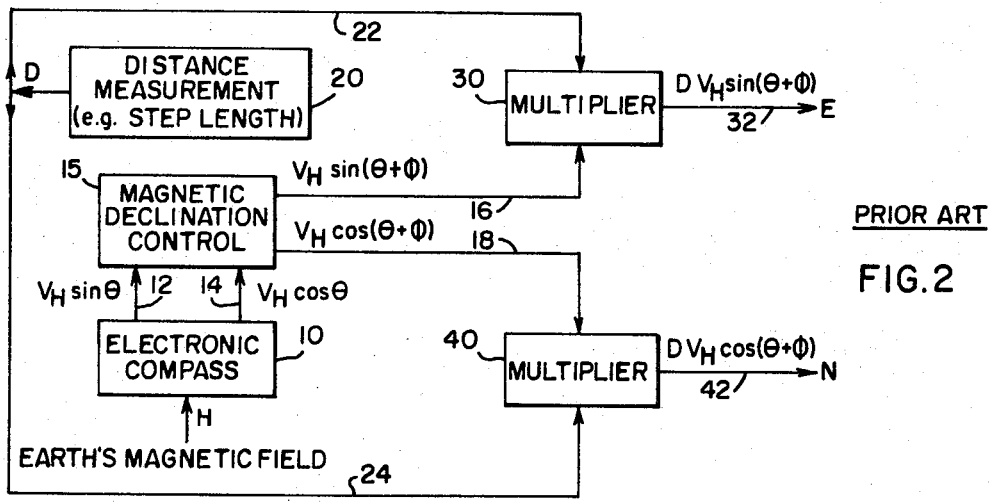
FIG. 2 is a block diagram of a prior art position locator.

A prior art position locator is illustrated in FIG. 2. Electronic compass 10 receives the Earth's magnetic field, H, and converts in into two component signals Hsin$\theta$ and Hcos$\theta$. The component signals can, therefore, be said to be a function of an independent parameter the magnitude of the Earth's magnetic field.

In order to understand the present invention, some principles of map making and map reading are necessary. The most widely used map system in the world is the UTM (Universal Transverse Mercator) mapping system. The Mercator projection method of making maps requires the taking of a spherical section of the Earth and projecting it and then flattening it out. This causes a difference between magnetic North and true North. True North is defined as a line from any portion of the Earth's surface to the North Pole. All lines of longitude are true North lines. Magnetic North is defined as the North that is established by a compass. Grid North is defined as the North that is established by the grid lines on a map. If it is desirable to correct the grid North shown on a map to the actual direction of magnetic NOrth as shown on a compass or vice versa, the factor of a declination angle must be added. The declination angle is defined as the angle between grid North and magnetic North.

Because the component signals Hsin$\theta$, Hcos$\theta$ are referenced to magnetic North, they are conducted along lines 12 and 14, respectively, to a magnetic declination control 15 which performs an electrical rotational transformation from the coordinate system of the electronic compass to the grid North and East coordinate system. That is, the outputs of the electronic compass which appear on lines 12 and 14 are rotated until one of the components is aligned with grid North and the other component is aligned with grid East. Therefore, the outputs of the magnetic declination control 15 are basically the same as the output of the electronic compass 10 except that the component signals have been varied due to the additional angular rotation. If the magnetic declination control 15 rotates the component voltages by an angle $\phi$, then the component signals which appear on lines 16 and 18, respectively, will be $V_H\sin(\theta + \phi)$ and $V_H\cos(\theta + \phi)$, where $V_H$ is a signal which is representative of the magnitude of the Earth's magnetic field.

As mentioned above, the position locator of FIG. 2 determines the direction of a vector of unit magnitude. The system also determines a scalar quantity which is proportional to the distance traversed by means of a distance measurement circuit 20. The output from distance measurement circuitry 20 is conducted along lines 22 and 24 to multipliers 30 and 40, respectively. The result of the multiplication is a signal which multiplies the unit vector by the scalar quantity determined by the distance measurement circuitry 20. The distance measurement circuitry is will known to those skilled in the art. Multipliers 30 and 40 each provide an output signal along lines 32 and 42, respectively. For example, the output on line 32 is represented by $DV_H\sin(\theta + \phi)$ and indicates the distance traversed in the East direction. It will be recognized that a negative quantity will indicate that a certain distance was traversed in the West direction. Similarly, the output signal on line 42 is represented by $DV_H\cos(\theta + \phi)$ and is representative of the distance traversed in the North direction. A negative quantity on line 42 will indicate that the direction traveled was South.

One disadvantage of the system illustrated in FIG. 2 is that the two outputs of the electronic compass are directly proportional to the magnitude of the horizontal component of the Earth's magnetic field. More specifically, the horizontal component of the Earth's magnetic field varies from 0.18 gauss to approximately 0.7 gauss. Therefore, as one traversed the Earth's surface, the electronic compass would be subjected to the deviations in the Earth's magnetic field and, consequently, its output would also be subject to proportional deviations. Referring to FIG. 2, the signals appearing on output lines 32 and 42 would therefore be subject to the deviations of $V_H$. As a result, the final determination of the East (for example) component of distance traveled would deviate by an amount proportional to the deviation of $V_H$ because the distance-related signal, D, is multiplied by $V_H$. The circuitry of FIG. 3 greatly reduces the effects of the deviations of the Earth's magnetic field to which the electronic compass is subjected.

Figure 3:
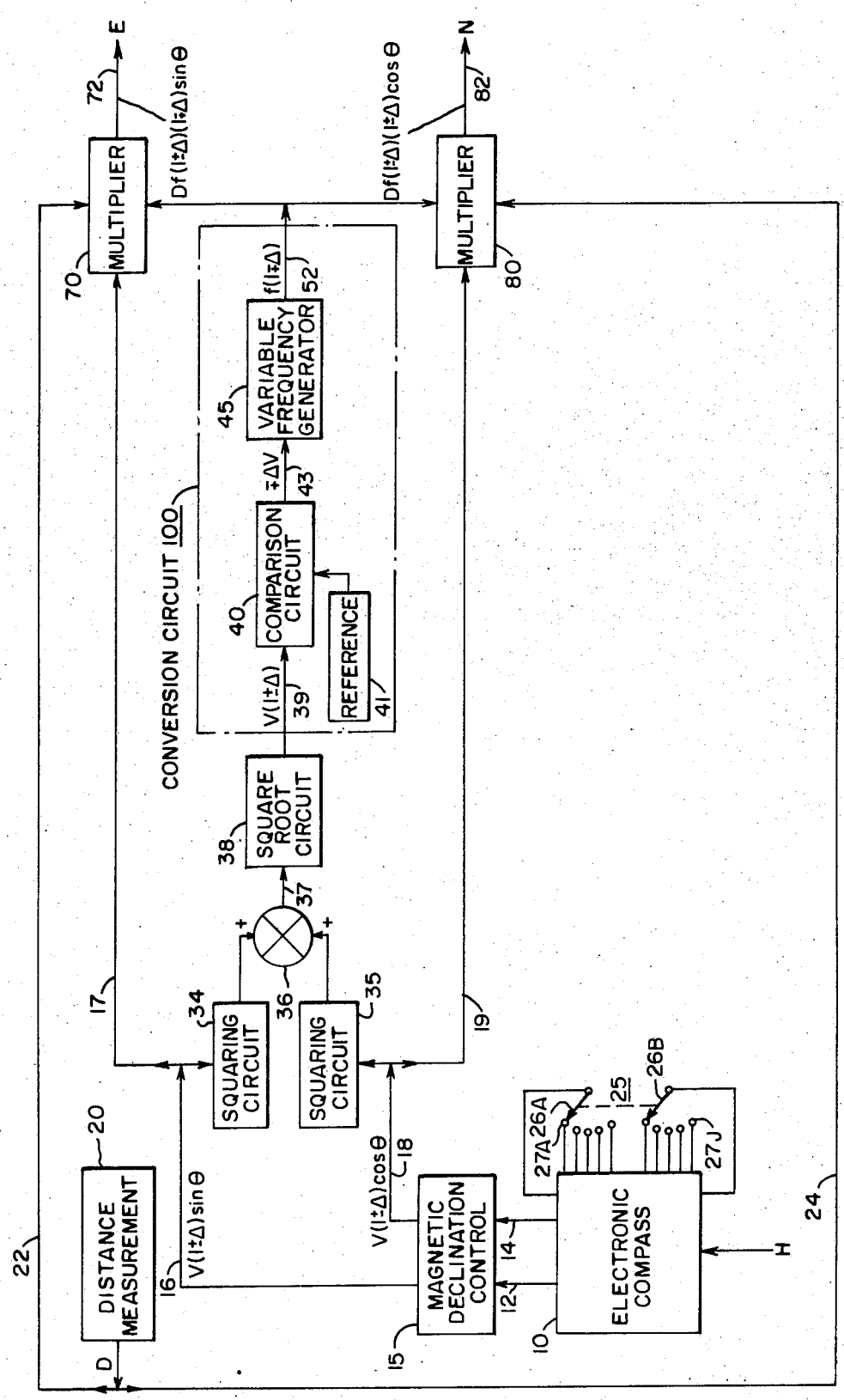
FIG. 3 is a block diagram of a preferred embodiment of a position locator.

As explained previously, the electronic compass of a position locator system resolves a unit vector into two components. Each of the two components are multiplied by a scalar quantity which is proportional to the total distance traveled. The result is a unique position in a rectangular coordinate system of a map. Referring to FIG. 3, the electronic compass 10 is positioned in and receives the Earth's magnetic field, H, as its input. The electronic compass utilizes orthogonal Hall generators and is commonly called a Hall compass. The Hall compass employs two orthogonallymounted Hall probes mounted on a platform that is designed to considered to be a nominal voltage means. In the operative embodiment, the nominal frequency $f_o$, of the VCO is 4.44 kHz.

To simplify the explanation, the discussion which follows assumes that the signal on line 39 has been adjusted to exactly equal the reference voltage — i.e., $\Delta=0$. It will be understood that only the initial value of $\Delta$ will be different if the operator is unable to initially adjust these two voltages equal to one another. System operation will be the same.

Therefore, assuming that the initial adjustment sets the initial $\Delta$ equal to zero, as the position locator is moved about the surface of the Earth, the magnitude of the resultant signal on line 39 will be subject to deviations because it will be responding to the deviations in the Earth's magnetic field. Consequently, the signal appearing on line 62 will increase or decrease about the nominal voltage. This increase or decrease appearing on line 62 will be reflected at the output 66 of the VCO 64. Its effect will be to vary the output frequency of the VCO by an amount proportional to the deviation, $\Delta$, which appears on line 62. Therefore, the signal appearing on line 66 will be related to $f_o(1\mp\Delta)$.

In an operative embodiment, the system is designed to provide a linear response for ± 1 percent deviation before readjustment of range gain switch 25 is required. Therefore, since the operative embodiment uses a reference voltage, $V_1$, of 2 volts, the magnitude of the resultant signal 39, when adjusted, will be substantially 2 volts and can vary from 1.8 volts to 2.2 volts. The frequency excursion of the VCO 64, which is correlated to the voltage change appearing on line 39, lies in the range of OkHz to 8.8 kHz. As explained above, the nominal frequency of the VCO 64 is 4.4 kHz when the voltage appearing on line 39 is 2 volts.

The variable frequency generator 45 also includes a pulse adder circuit 68. One input to the circuit 68 is a reference frequency $f_r$. In an operative embodiment, reference frequency $f_r$ is 40 kHz. Another input into pulse adder circuit 68 is the frequency signal appearing on line 66. The frequency of the reference frequency is not variable. The pulse adder circuit adds together the frequency of the reference frequency with the frequency output of the VCO which appears on line 66.

When the system has been adjusted, the frequency output, $f$, appearing on line 52 will be 44.4 kHz. As the magnitude of the Earth's magnetic field varies, so will the output frequency appearing on line 52 vary proportionately. The signal appearing on line 52 is related to $f(1\mp\Delta)$. It will be noted that the output frequency appearing on line 52 is a signal which is equal to 44.4 kHz ± 10 percent. As can be seen, the signal on line 52 contains an error signal which is ± 10 percent of 44.4 kHz. Therefore, if after adjustment, the magnitude of the Earth's magnetic field as reflected by the signal on line 39 varies by ± 10 percent, the error signal appearing as a variable frequency on line 52 will vary by $\mp$ 10 percent in an exact inverse relationship.

It will be understood by those skilled in the art that any standard circuitry can be used for the difference circuit 55, the amplifier 58, the summing circuit 60, the voltage controlled oscillator 64, the pulse adder circuit 68 and the multiplier circuits 70 and 80. The only requirements are that each individual circuit perform in such a manner as to provide the proper output signal.

Furthermore, the nominal frequency, $f_o$, of the VCO 64 and the reference frequency which is fed into the adder 68 must be so related that the nominal frequency of the VCO is 10 percent of the sum of $f_o$ and $f_r$.

The signal appearing on line 52 is then directed to each of the multiplier circuits 70 and 80. As described previously, each of the multiplier circuits also includes an input from the distance measuring circuit 20. Multiplier 70 receives the distance measurement voltage along line 22 and multiplier circuit 80 receives the same voltage, D, along line 24. Furthermore, multiplier circuit 70 receives a voltage which is related to direction from line 17 and multiplier 80 receives a similar voltage from line 19.

Figure 4:
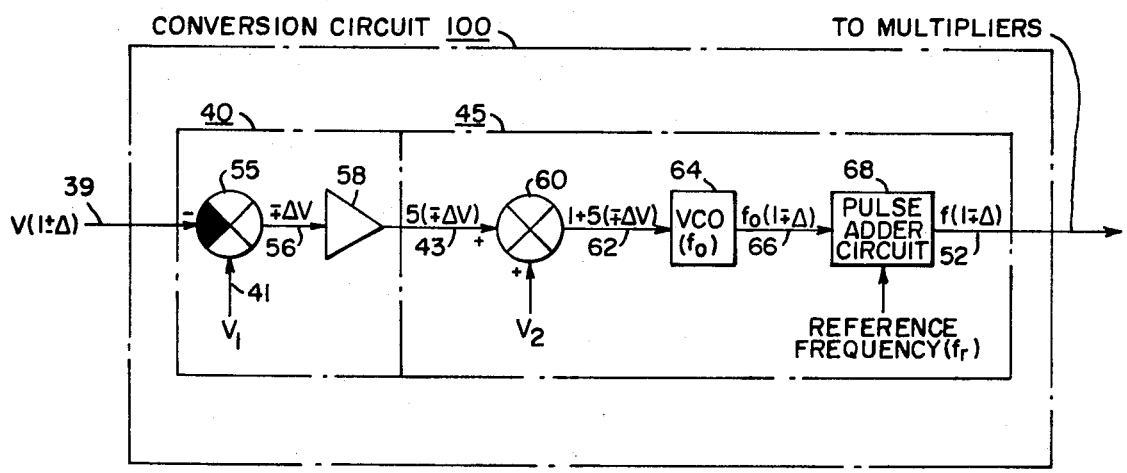
FIG. 4 is a more detailed block diagram of a portion of the preferred embodiment of the position locator.

The multiplier 70, for example, operates by gating the signal appearing on line 52, which includes the error signal, for a length of time which is directly proportional to the magnitude of the signal appearing on line 22 and the magnitude of the signal appearing on line 17. Each time a step is taken, a voltage is produced by the distance measurement circuit 20 along line 22. If a larger step is taken, a larger voltage will appear on line 22 than would be the case if a smaller step were taken. Furthermore, if, for example, the person carrying the position locator moved to a position on the earth in which the Earth's magnetic field decreased, the voltage on line 17 would decrease proportionally and the width of the gate in multiplier 70 would also decrease proportionally. The compensation circuitry shown in FIG. 4 would operate to increase the pulse frequency such that the total number of pulses gated to output line 72 remains constant. This inverse reaction is provided by the comparison circuit 40 which results in a $\mp$ type of signal on line 43. It must be remembered that one of the overall purposes of the present normalization circuit is to compensate for changes in the Earth's magnetic field. Therefore, if the Earth's magnetic field tends to decrease, the circuit must compensate for this by making it look as if the magnetic field did not change. This compensation is accomplished by increasing the number of pulses per unit time on output line 52. Multiplier 80 operates in a similar manner.

What has been described, then, is a normalization circuit which compensates for variations in the Earth's magnetic field as a position locator is moved about while mounted on the back of a person who is walking on the Earth's surface. Under normal conditions, it is able to maintain a distance calibration with ± 1 percent while the Earth's magnetic field varies by ± 10 percent.

What is claimed is:

1. Position locator apparatus comprising;
   means for providing a distance signal indicative of distance traveled;
   means for generating first and second heading signals related to the direction traveled, said first and second heading signals being subject to deviations of the Earth's magnetic field;
   reference means for providing a predetermined reference signal in relation to some initial value of said first and second heading signals;
   means for providing a resultant signal related to the magnitude of the Earth's magnetic field at the locator position;
   means for providing an error signal related to the difference between said reference signal and said resultant signal; and means for multiplying said distance signal with said error signal and with each said first and second heading signals to provide output signals which are indicative of the distance traversed in the direction traveled, said error signal reducing the effect of said deviations in the Earth's magnetic field on said output signals.

2. The apparatus of claim 1 including adjusting means operable to adjust the magnitude of said resultant signal substantially to the magnitude of said reference signal.

3. The apparatus of claim 1 wherein said means for providing said resultant signal includes square means for squaring said first and second heading signals, summing means for adding together said squared signals and for providing a sum signal equal to the sum of said squared signals, and means for taking the square root of said sum signal.

4. The apparatus of claim 1 wherein the means for providing said error signal includes a conversion circuit means having a voltage controlled frequency generator means having an input and an output, said frequency generator means producing a variable frequency at its output in response to a variable signal at its input.

5. The apparatus of claim 4 wherein said conversion circuit means further includes a comparison circuit for obtaining a signal equal to the difference between said reference signal and said resultant signal and wherein the variable signal input to said frequency generator means is a function of said difference signal.

6. The apparatus of claim 5 wherein said variable signal is a variable voltage and said voltage controlled frequency generator includes a voltage controlled oscillator, the output frequency of said voltage controlled oscillator being variable in response to said variable voltage.

7. A circuit for receiving component signals derived from a parameter subject to deviations, said component signals being subject to said deviations, the improvement comprising; means responsive to said component signals for providing a resultant signal indicative of the magnitude of said parameter; reference means for providing a reference signal; adjustment means for establishing a predetermined relationship between the magnitude of said resultant signal and said reference signal by initially adjusting at least one of them; conversion means having input means and output means; means for conducting said resultant signal and said reference signal to said input means, said output means being operative to provide an error signal indicative of the magnitude of said deviations as the magnitude of said resultant signal changes from the magnitude which provided said predetermined relationship; and conducting means for conducting said error signal to signal receiving means for comparison with said component signals.

8. The circuit of claim 7 wherein the input means of said conversion means includes a difference circuit for comparing the magnitude of said resultant signal with the magnitude of said reference signal and for producing an output signal indicative of the difference between said resultant signal and said reference signal.

9. The circuit of claim 8 wherein the output means of said conversion means includes a variable frequency generator, the output frequency of said generator being controlled by the output signal of said difference circuit of said conversion means.

10. The circuit of claim 9 wherein said output means includes nominal voltage means for providing a predetermined nominal voltage and wherein said variable frequency generator includes a voltage controlled oscillator operable to provide a nominal frequency output, said predetermined nominal voltage being conducted to said voltage controlled oscillator to cause said voltage controlled oscillator to provide said nominal frequency output whenever the magnitude of said resultant signal is substantially equal to the magnitude of said reference signal.

11. The circuit of claim 7 wherein the output means of said conversion means is operable to provide a predetermined signal when said adjustment means establishes said predetermined relationship between said resultant signal and said reference signal.

12. The circuit of claim 7 wherein said predetermined relationship is established when said adjustment means adjusts the magnitude of said resultant signal such that it is substantially equal to the magnitude of said reference signal.

* * * * *